United States Patent
Haug

(10) Patent No.: US 8,854,455 B2
(45) Date of Patent: Oct. 7, 2014

(54) METHOD AND DEVICE FOR PROCESSING RECORDED IMAGE INFORMATION FROM A VEHICLE

(75) Inventor: Karsten Haug, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 12/989,921

(22) PCT Filed: Nov. 19, 2008

(86) PCT No.: PCT/EP2008/065795
§ 371 (c)(1),
(2), (4) Date: Oct. 27, 2010

(87) PCT Pub. No.: WO2009/135541
PCT Pub. Date: Nov. 12, 2009

(65) Prior Publication Data
US 2011/0043624 A1 Feb. 24, 2011

(30) Foreign Application Priority Data
May 9, 2008 (DE) .......................... 10-2008-001-679

(51) Int. Cl.
*H04N 7/18* (2006.01)
*G06K 9/00* (2006.01)
*B60S 1/08* (2006.01)

(52) U.S. Cl.
CPC ............... *G06K 9/00791* (2013.01); *B60S 1/08* (2013.01)
USPC .................................. 348/135; 348/E07.085

(58) Field of Classification Search
CPC ...... G01B 11/022; G01B 11/024; H04N 7/18; H04N 7/181; G01C 15/00
USPC ........................................................... 348/135
See application file for complete search history.

(56) References Cited

U.S. PATENT DOCUMENTS

| | | | |
|---|---|---|---|
| 6,281,649 B1 * | 8/2001 | Ouellette et al. | 318/443 |
| 6,498,536 B1 * | 12/2002 | Mori | 331/11 |
| 2006/0157639 A1 * | 7/2006 | Shaffer et al. | 250/208.1 |
| 2007/0041657 A1 * | 2/2007 | Rychagov et al. | 382/274 |
| 2007/0047809 A1 | 3/2007 | Sasaki | |
| 2008/0044062 A1 * | 2/2008 | Stam et al. | 382/104 |
| 2008/0273753 A1 * | 11/2008 | Giuffrida et al. | 382/103 |
| 2009/0180682 A1 * | 7/2009 | Camus | 382/154 |
| 2010/0029293 A1 * | 2/2010 | Bergh et al. | 455/456.1 |
| 2010/0066867 A1 * | 3/2010 | Yoshikawa | 348/241 |
| 2010/0195674 A1 * | 8/2010 | Tapie et al. | 370/516 |

FOREIGN PATENT DOCUMENTS

| | | |
|---|---|---|
| DE | 102 19 788 | 11/2003 |
| DE | 103 03 046 | 10/2004 |
| EP | 1 334 888 | 8/2003 |
| WO | 2005/039957 | 5/2005 |

* cited by examiner

*Primary Examiner* — Sath V Perungavoor
*Assistant Examiner* — Nam Pham
(74) *Attorney, Agent, or Firm* — Kenyon & Kenyon LLP

(57) ABSTRACT

A method for improving the driver assistance function, in particular of driver assistance systems based on video images recorded from a vehicle, and a corresponding device for that purpose made up of a camera and processing unit. To improve the function during rain, the passing of a windshield wiper through the camera image be used to classify individual images and/or portions of images as being of higher or lower quality, in order to improve the quality of the images from the camera. The images from camera are intended to be used for automatic driver assistance systems.

15 Claims, 3 Drawing Sheets

METHOD AND DEVICE FOR PROCESSING RECORDED IMAGE INFORMATION FROM A VEHICLE

FIELD OF THE INVENTION

The present invention relates to a method and a device for processing image information recorded from a vehicle.

BACKGROUND INFORMATION

Image data of the vehicle's surroundings, supplied by cameras, are required for a great many different driver assistance systems in vehicles. These image data aid in staying in lane (LDW or lane departure warning), to warn the driver for example that he/she is becoming excessively tired; in automatic lane monitoring (LKS or lane keeping support), for example as part of an automatic vehicle steering system; in recognizing traffic signs (RSR, road sign recognition); or with active night vision support with object recognition and warning function. The image data for night vision support are provided by cameras that are capable of night vision.

All systems that have a camera-based active recognition function based on image data of the vehicle's surroundings have in common that they are very sensitive to the quality of the available images. Recognizing road boundaries or center lines, as well as recognizing traffic signs, requires a high-quality image from the driver's perspective. Since the cameras used for this purpose are mostly located in the upper center of the windshield, or else in specially situated cavities of the vehicle, the cameras do not have access to a better view through the windshield than the driver does. Consequently, the performance of these systems drops off considerably during rain, because the optical path of the cameras is severely impaired, and therefore center lines can either no longer be recognized at all or only erratically, and road signs cannot be detected at all.

In particular the images of the vehicle's surroundings during rain through the rain-dampened windshield, in some cases severely distorted, enable the above-named driver assistance systems to analyze the recorded image only inadequately or not at all, or raindrops on the windshield act like local lenses and blind the camera so severely that it can no longer record usable images.

Techniques are discussed in DE 102 19 788 for interpreting the image information by evaluating the contrast relationship to an extent where it is possible to determine the effective visual range, so that the complete unit is able to separate usable image information from unusable image information. An actual improvement of the driver assistance function cannot be achieved by this technique, however.

SUMMARY OF THE INVENTION

The exemplary embodiments and/or exemplary methods of the present invention provides a method for improving the driver assistance function, in particular for driver assistance systems that are based on video images recorded from a vehicle. Through weighting, or even by selecting individual video images or areas of individual images, the image data available for the driver assistance function are subdivided into image data of better or poorer quality.

The exemplary embodiments and/or exemplary methods of the present invention makes use of the effect of a windshield wiper. Images of better quality are obtainable immediately after the wiper has passed over the windshield. Even images that depict the wiper shadow have image portions of higher quality and image portions of lower quality. It is therefore important when recording images to distinguish the images or image portions of higher quality from those images or image portions that are distorted or even unusable due to moisture on the windshield.

Accordingly, a device is proposed for recording image information from a vehicle, having at least one camera and at least one processing unit, the processing unit subdividing the image information from the camera into individual image units and performing a statistical calculation for each individual image unit, the processing unit using the data of the statistical calculation to decide whether or not a wiper shadow is present in the image unit and whether the quality of the image information is high or low. There therefore may be a test of whether the quality of the image information is higher or lower than a predefined quality threshold.

Additional advantageous embodiments of the present invention are specified herein.

To carry out the method, a processing unit which evaluates the image information is connected to the output side of a video sensor. The evaluation results in detection of the windshield wiper shadow in the image information from the video sensor, and this detection of the position and point in time of the wiper shadow in the image information is used to distinguish whole images or individual image areas of high quality from images or image areas of low quality. This may occur by distinguishing whether the quality of images or image areas is higher or lower than a predefined threshold value. If the quality is higher than a predefined threshold, then the images or image portions are of high quality. If the quality is lower than a predefined quality threshold, then the images or image portions are of low quality.

In an individual image the differentiation is made through a spatial division of the individual image by a windshield wiper shadow, the high-quality image areas having been swept by the wiper just recently and the low-quality image areas having been swept by the wiper a longer time ago or even being just about to be wiped, where the available image is particularly poor due to a windshield wiper bow wave. In the simplest case, the image is subdivided by the processing unit into individual image areas, which may be into contiguous circular segments, and the processing unit determines the brightness histogram for each individual image area. It is possible to determine from the histogram whether or not the circular-segment-shaped image area is covered by a windshield wiper in the circular segment.

To determine whether a windshield wiper has covered the image, the histogram of each image area is evaluated, and a predominantly large number of dark image points in relation to the surrounding image areas indicate a windshield wiper or part thereof in the image area. In order to determine from a histogram that depicts a distribution of the brightness values of all image points whether it has predominantly dark or predominantly light image points, it is possible to correlate it with another histogram, where the other histogram depicts an ideal brightness distribution of an image area shaded by a windshield wiper. After a windshield wiper or its shadow has been positively detected by the processing unit, the processing unit is able to classify the image areas that have low image quality, because the image areas that have just been swept by a wiper usually have a better image, which is not distorted by a wet windshield.

When the image data are evaluated by the driver assistance system to generate the driver assistance signals, the areas having better-quality image data are weighted more heavily than the image areas having poorer-quality image data. The algorithm utilized in the driver assistance system for evaluating the images determines the best type of weighting for the images or image areas of different quality, which may be applied in principle at two places in the algorithm. Images or image areas of differing quality may enter into the algorithm for analysis together with a number that corresponds to a weighting, or the images are evaluated first by the algorithm without weighting information and the result of the analysis using a chosen algorithm is weighted with the aid of the information about the quality of the particular analyzed image itself. Finally, it is also possible to use both methods side-by-side for the weighting. Weighting, which is explained below in greater detail, makes it possible to perform the recognition of road signs or the recognition of center lines with greater reliability, because the driver assistance signals are influenced to a greater degree by higher-quality images and only to a lesser degree by lower-quality images.

When recording consecutive images, it is possible to improve the weighting of the image data by synchronizing the timing of recording the images with the motion of the windshield wiper. To this end, advantageous use is made of a PLL method, a software-implemented phase locked loop (PLL), which synchronizes a phase counter and the result of the positive wiper detection with each other. Especially in vehicles that are unable to supply exact information about the wiper position, this method is suitable for supplying information about the phase status of the windshield wiper relative to the image recording in a wiper cycle to the algorithm for image evaluation simultaneously with the individual images from the video sensor. For a sequence of many images that extend in time over a plurality of windshield wiper cycles, this results in a temporally periodic weighting of the images as a function of the windshield wiper phase, the images that were recorded in the time immediately after a wiper sweep entering into the image analysis with a higher weighting factor than images that were recorded shortly before a wiper sweep due to the correlation of the phase counter with the wiper frequency.

To synchronize the weighting of individual images with the aid of the PLL method, the phases of two signals are compared to each other, and one signal is adjusted to the other until a stable phase relationship between the two signals prevails. The first signal used here comes from an algorithm of the windshield wiper detection that shows the logical value "true" twice for a short time within a complete wiper cycle, namely once when the wiper passes over the image from the video sensor during the first forward sweep and once when it passes over the image during the second return stroke. Accordingly, this signal of the detection of the windshield wiper cycle shows the logical value "false" between the logical values "true," namely when the wiper is not depicted in the image. A second signal for the synchronization is a phase counter, which may begin at any desired point in a windshield wiper cycle and may count the phase at any desired frequency within the limits of the phase counter. Since the windshield wiper is in the image for a predetermined portion of the wiper phase due to its mechanical configuration, a logical value of "true" is assigned to the phase counter for this portion and the logical value "false" for the remaining portions of the phase.

The PLL algorithm thereupon changes the phase of the phase counter and the frequency until the windshield wiper detection signal, which possibly varies in frequency together with the wiper due to a rain sensor controller, is running synchronously. A more detailed explanation of the PLL algorithm can be found in the technical literature. Thus when weighting the image information, the signal from the phase counter generated by the PLL algorithm is used to weight the image information. In so doing, a weighting value is assigned to each phase value of the phase counter, either by a table or by a closed function, so that there is first a clear phase relationship to the wiper motion for each individual image, namely in the form of a phase status, expressed for example by 0 to $2\pi$, 0° to 360° or a direct number, and via this phase relationship a weighting factor is assigned to the image, for example in the interval from 0 to 1, which stands for the usability of the image information, 0 standing for completely unusable in the example given above and 1 for entirely usable.

Synchronization makes it possible to anticipate the passing of the wiper over the recorded image. Because it is known when the next wiper sweep will occur, a high quality measure may be assigned to the first image after the wiper sweep and subsequent images are given a quality rating using a time decay function, so that the image immediately before another wiper sweep is rated the lowest in quality. If it is possible to obtain data from an electrical bus system of the vehicle about whether or not a windshield fan is turned on, it is advantageous not to assign the highest quality rating to the first image after detection of the wiper, but rather to an image recorded longer after the wiper sweep than the first image. This is because a windshield fan may cause wiper streaks that remain after the wiping to evaporate. Hence the image having the highest quality rating is pushed back in time in relation to the wiper sweep.

In a refinement of the method, along with the histogram evaluation for generating a signal for detection of the windshield wiper and subsequent synchronization of the wiper position with the wiper frequency to generate a factor for the weighting, it is also possible to assess the quality of individual image areas by determining the noise level. Images with a high noise level are of lower quality than images with a low noise level. This determination of noise level may be carried out independently of the detection of the windshield wiper.

To further improve the quality determination, plausibility checks may also be performed, which use the time between two windshield wiper passes expected from the synchronization, for example, to check the content of the quality determination. For example, an image or image area that has not been swept by a windshield wiper for a long time must be of poorer quality than an image or image area which was recorded at a time in which the last wiper sweep had been made just shortly before. The location of the image area may also be used for a plausibility check. For example, an image area that is in front of the windshield wiper in relation to the wiper path must be poorer than an image area that is located immediately behind the moving wiper.

In a particular embodiment of the invention, angle sensor data from the windshield wiper may also be used for synchronizing the phase counter with the weighting. In this case the present position angle of the windshield wiper is read by an angle sensor connected to the wiper and the phase counter is synchronized with this signal.

In order to improve the quality of evaluation of the image data by the driver assistance system still further, a conventional rain sensor that adjusts the frequency of the windshield wiper may be connected to the system. This signal is used for synchronizing the phase counter, in order to establish a stable phase relationship between the changing windshield wiper frequency after changing rain conditions and the phase counter as quickly as possible. A further effect of the rain sensor coupled with the windshield wiper controller is that the image from the video sensor is not swept by the wiper more frequently than necessary, because in light rain an excessively high frequency of the wiper may result in a large number of low ratings of a recorded image, because the wiper passes through the camera image more frequently than necessary and thereby frequently degrades large image portions unnecessarily.

Yet another improvement creates synchronization of the exposure control of the camera with the windshield wiper. A non-synchronized exposure control could begin to oscillate due to the recurring windshield wiper shadow and increase the exposure of the objects of interest as the wiper passes, and reduce it to a regulated measure between two coverages. But if the exposure control is synchronized, then the higher quality image portions that are behind the sweeping windshield wiper are usable for an evaluation, these image portions being incorporated into the other image portions with regulated exposure and no erroneous artifacts being incorporated into the analysis due to incorrect exposure or overexposure.

The exemplary embodiments and/or exemplary methods of the present invention will be explained in further detail on the basis of the accompanying figures.

DETAILED DESCRIPTION

Figure 1:
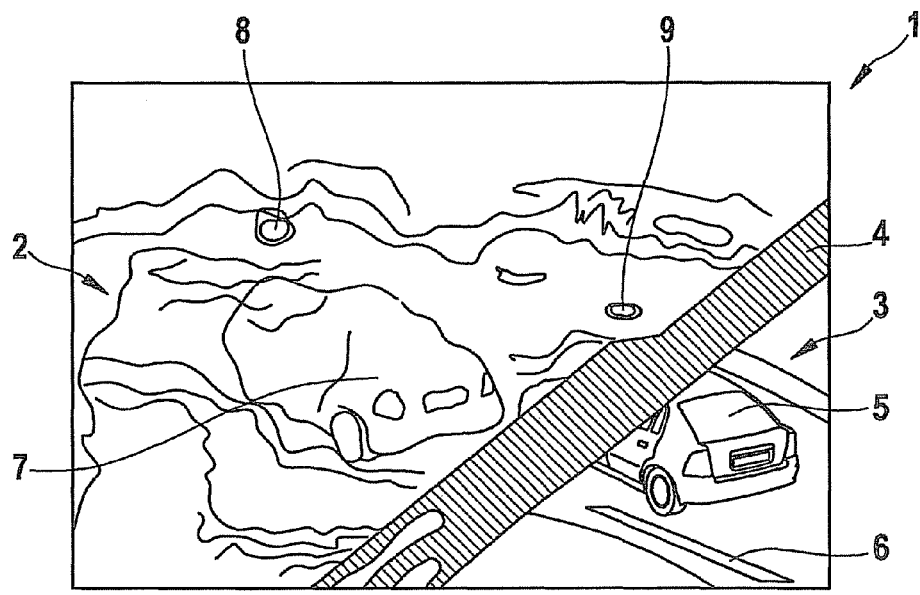
FIG. 1 shows a schematic image of a camera for a driver assistance program including the shadow of a windshield wiper.

FIG. 1 shows a schematic camera image 1, which is used for a driver assistance system such as RSR, LDW or LKS. Camera image 1 has an image area 2 having very poor quality and an image area 3 having better quality. The two image areas 2 and 3 are separated from each other by a windshield wiper shadow 4, windshield wiper shadow 4 gliding from right to left across image 1. In better-quality image area 3 there are individual image components 5 and 6 present which may be recognized as the rear deck of a vehicle and as a road marking. In poorer-quality image area 2 an image component 7 is likewise visible, which is recognizable only vaguely as the rear deck of another vehicle, because rain on the windshield through which image 1 is recorded distorts the view beyond recognition. In addition to the distortion, short-lived water drops 8 and 9 are present in poorer-quality image area 2, which act like lenses and focus light from preceding vehicles and may blind an exposure control for the camera. Poorer-quality image area 2 is nearly unusable for analysis by a driver assistance system 300 in FIG. 5; at least, however, it is included in an image analysis having very low weighting.

Figure 2:
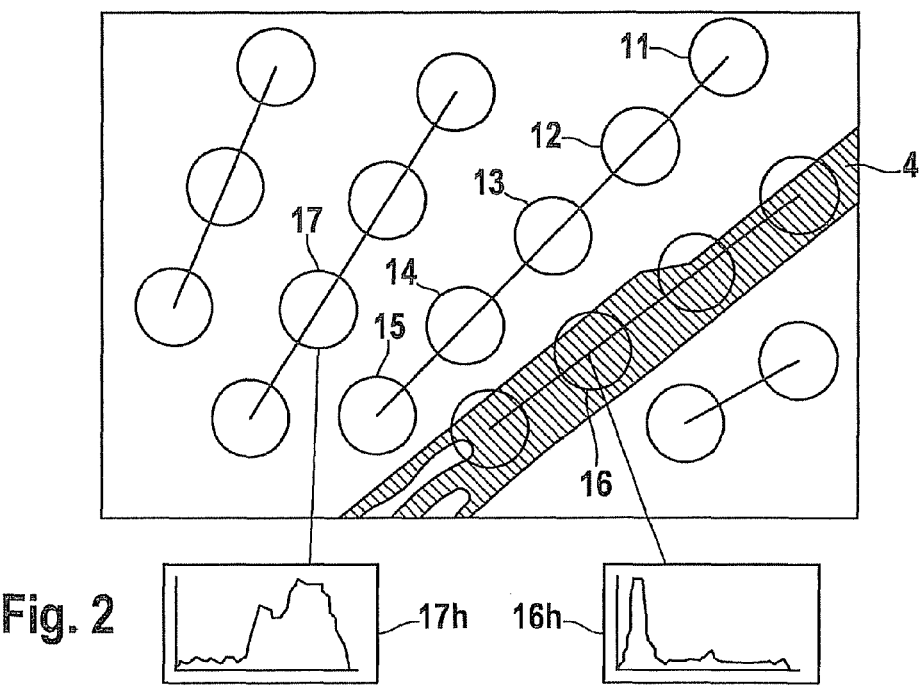
FIG. 2 shows an example of a division of the image into circular segments.

In order to detect the passage of a windshield wiper shadow 4, FIG. 2 depicts how partial areas of image 1 are divided into circular segments 11, 12, 13, 14, 15, 16, 17, 18, 19, 20, 21 and 22, the size being chosen so that the width is within the order of magnitude of the wiper image. Circular segments 11, 12, 13, 14, 15, 16, 17, 18, 19, 20, 21 and 22 are advantageously situated so that they are aligned with the orientation of windshield wiper 4 which is passing over camera image 1. This enables the circular segments to be grouped, and if a windshield wiper shadow 4 passes over camera image 1, histograms of image areas 11, 12, 13, 14, 15, 16, 17, 18, 20, 21 and 22 exhibit approximately histogram 14'. In contrast, the image area that is overlapped by a windshield wiper shadow 4 exhibits approximately histogram 19'. By correlating each histogram with an ideal histogram for an image area that is covered by a windshield wiper, the function for wiper detection generates its signal, a high correlation resulting in a positive detection signal while a low correlation on the other hand results in a negative detection signal.

Figure 3:
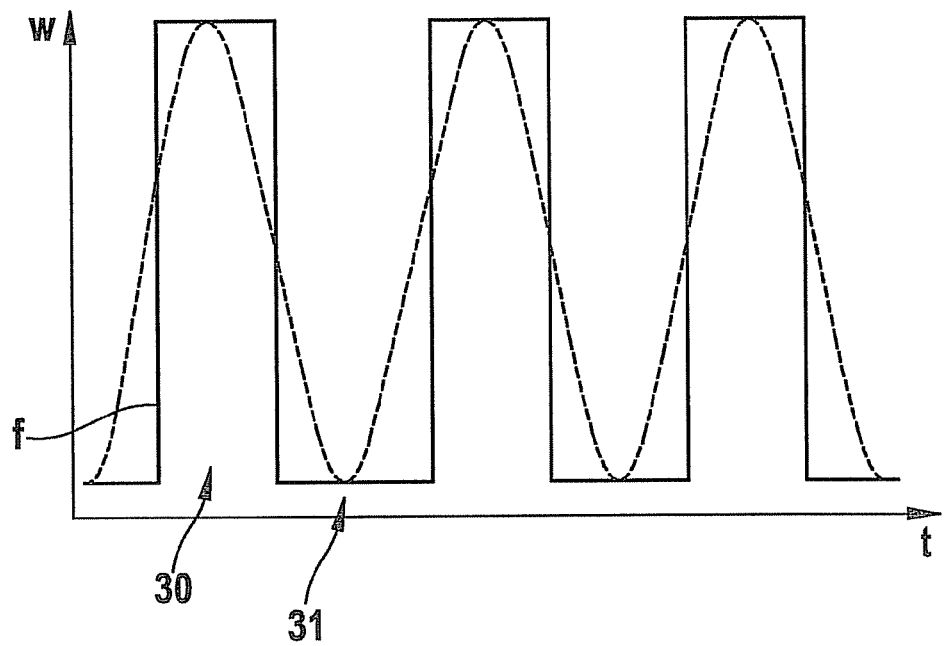
FIG. 3 shows a block diagram of the image weighting function.

FIG. 3 depicts a block diagram 30 of the image weighting function. Video images 23, which come from a video sensor 24, are fed directly to driver assistance function 25 and to a windshield wiper detection function 26. Windshield wiper detection function 26 is directly coupled to the actual sweeping of video image 23 by the wiper. The signal coming from windshield wiper detection function 26 enters into a software-implemented PLL 27, which generates a phase counter signal and synchronizes it with the signal from windshield wiper detection function 26. Optionally, PLL 27 receives an additional signal 28 of rain moisture detection from a rain sensor to vary the windshield wiper frequency of a rain sensor. The synchronized phase counter signal then goes to driver assistance function 25, where a weighting factor is assigned to this signal. This weighting factor is used to weight video images 23 for evaluation and thereby to improve output signal 29 of the driver assistance function.

Figure 4:
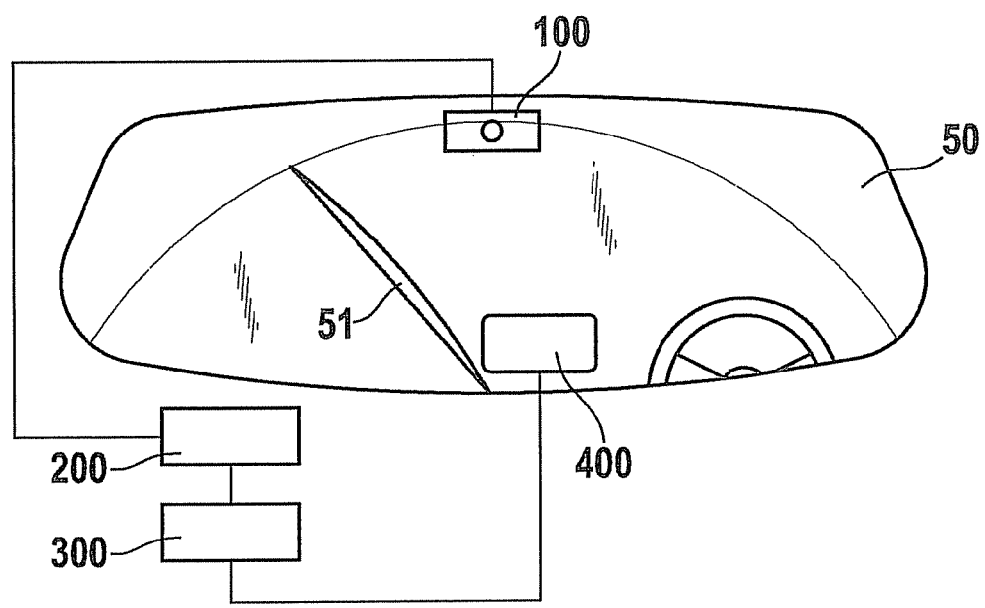
FIG. 4 shows a diagram to explain the decline in image quality.

FIG. 4 depicts the variation over time of a quality measure q of the image quality, the quality measure q (not defined in greater detail here) being plotted on the abscissa and the time t or the sequence of individual images from a video sensor being plotted on the ordinate. At discontinuity points 40 and 41 the image is swept by the windshield wiper. In the exemplary diagram in FIG. 4 the camera records 10 images per half wiper period. The first image after each wiper pass has the highest quality measure, which is entered at points 42a, 42b and 42c. Toward the right in the diagram, the entered points 42a, 42b and 42c are followed by images that have poorer quality as the time increases since the last wiper pass. The decline in quality normally follows a typical decay curve, the exact pattern being dependent on a plurality of different parameters, such as the surface quality of the windshield, the age of the wiper, the intensity of the rain, the size of the raindrops, the dirtiness of the water striking the windshield, detergent residues on the windshield and other parameters not listed here. A wiper cycle from 0° to 360° or from 0 to 2π includes the progression from a first discontinuity point, for example 39, to the next discontinuity point thereafter, for example 41, because the windshield wiper passes over the image twice in one cycle. Since the windshield wiper only oscillates back and forth within a certain angle, the cycle from 0° to 360° corresponds to actual wiper positions from approximately 0° to approximately 90° relative to the horizontal, depending on the mechanical construction of the windshield wiper.

Figure 5:
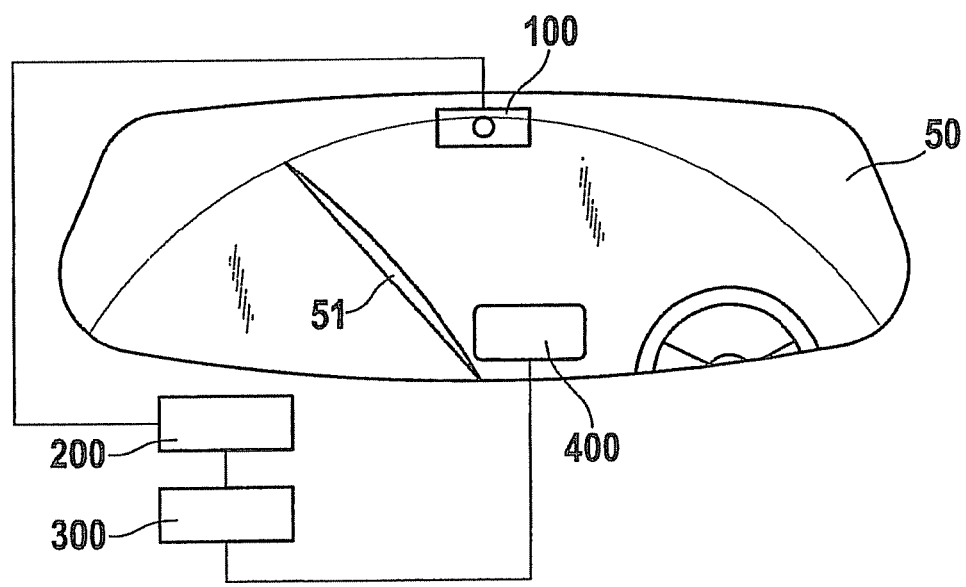
FIG. 5 shows a block diagram of a driver assistance system of a device for improving the image information according to one specific embodiment of the present invention.

Finally, FIG. 5 depicts the view of a windshield 50 with windshield wiper 51 drawn in and with camera 100 depicted at the top center. Camera 100 records images through windshield 50 in order to record details in the vehicle's surroundings, which are evaluated by a driver assistance system 300, and the result of the evaluation is displayed for the driver for support on a human-machine interface (HMI) 400, which may be visual, acoustical, or tactile. In order to improve the image information for driver assistance system 300, a processing unit 200 is connected between the driver assistance system and the camera, which analyzes the camera image from camera 100 and combines it so that only higher-quality images are weighted higher in the driver assistance system.

What is claimed is:

1. A method for processing image information recorded from a vehicle, the method comprising:
   detecting at least parts of a windshield wiper in the image information;
   using results of the detecting to identify portions of a recorded image that have recently been swept by the windshield wiper; and
   dividing the image information into higher-quality and lower-quality image information, wherein the image information is divided into image information whose quality is higher than a predefined threshold value and image information whose quality is lower than the predefined threshold value, wherein the dividing of the image information into higher-quality and lower-quality image information takes into account at least the presence of a moisture on the windshield, and wherein image information corresponding to image portions that were identified as recently swept are assigned a higher quality compared to image information corresponding to image portions that have not recently been swept.

2. The method of claim 1, wherein a phase counter is synchronized with the time periods between two consecutive detections of a windshield wiper, and wherein the image information that is recorded immediately after a first recorded image is swept by the windshield wiper is given the highest quality ranking with the aid of the phase counter and the image information that is recorded immediately before a second recorded image is swept by the windshield wiper detector is given the lowest quality ranking.

3. The method of claim 2, wherein:
   the image information of an individual image is spatially divided by a detected windshield wiper shadow into higher-quality image information and lower-quality image information; and
   by alternatingly determining the quality of the image information as a function of the detection of a windshield wiper, the spatial division is carried out when the detection of the windshield wiper in the image is positive and the quality ranking is carried out with the aid of the synchronized phase counter when the detection of a windshield wiper in the image is negative.

4. The method of claim 2, wherein the image information is shifted and then ranked as higher quality which is recorded at a later time than immediately after being swept by the windshield wiper, if data are present indicating that a windshield fan is switched on.

5. The method of claim 2, further comprising:
   performing a software-implemented PLL synchronization in which the detection of the windshield wiper in the image is compared to the progression of an image counter, wherein a phase difference is found if the progression of the image counter does not coincide in time with the detection of the windshield wiper, and in this case the progression of the image counter being varied by varying the number of images to be counted until the detection of the windshield wiper in the image coincides in time with the progression of the image counter.

6. The method of claim 2, further comprising:
   performing a synchronization of the quality ranking with angle sensor data for the windshield wiper.

7. The method of claim 2, further comprising:
   performing a synchronization of the exposure parameters with the detection of the windshield wiper.

8. The method of claim 1, wherein the image information of an individual image is spatially divided by a detected windshield wiper shadow into higher-quality image information and lower-quality image information.

9. The method of claim 1, wherein a windshield wiper is detected by determining a noise level of individual image portions, and wherein the image portions that have a high noise level are classified as of lower quality and the image portions that have a low noise level are classified as of higher quality.

10. The method of claim 1, wherein a windshield wiper is detected by dividing the image information into individual image portions, wherein a brightness histogram is subsequently determined for each individual image portion, and wherein the image portions that have low exposure in comparison to the other image portions are evaluated as being covered by the windshield wiper.

11. The method of claim 1, further comprising:
    performing an additional plausibility check of the quality ranking for different image areas, wherein at least one of the location of the image areas, the time of the last positive windshield wiper detection, and the time from the synchronization parameters are used for the plausibility check.

12. The method of claim 1, further comprising:
    applying the image information as input to an analysis algorithm; and
    applying a weighting factor to at least one of:
      individual images prior to the input of the image information into the analysis algorithm,
      image portions prior to the input of the image information into the analysis algorithm, and
      a result of the analysis algorithm;
    wherein the weighting factor varies as a function of image quality.

13. A device for processing image information recorded from a vehicle, comprising:
    at least one camera; and
    at least one processing unit for subdividing the image information from the camera into individual image portions and performing a statistical calculation for each individual image unit;
    wherein the processing unit uses the data of the statistical calculation to determine:
      whether at least part of the windshield wiper is present in the particular image unit,
      where at least part of the windshield is present, portions of a recorded image that have recently been swept by the windshield wiper, and
      whether the quality of the image information is high or low, in particular whether the quality of the image information is higher or lower than a predefined threshold value,
    wherein the dividing of the image information into higher-quality and lower-quality image information takes into account at least the presence of a moisture on the windshield, and
    wherein image information corresponding to image portions that were identified as recently swept are assigned a higher quality compared to image information corresponding to image portions that have not recently been swept.

14. The device of clam 13, wherein the processing unit uses time data additionally for the statistical calculation and uses those time data in the form of a synchronization, which is a PLL synchronization, to improve the detection of the windshield wiper in individual image portions through anticipation.

15. The device of claim 13, wherein the processing unit applies the image information as input to an analysis algorithm, the processing unit applying a weighting factor to at least one of:
- individual images prior to the input of the image information into the analysis algorithm,
- image portions prior to the input of the image information into the analysis algorithm, and
- a result of the analysis algorithm;
- wherein the weighting factor varies as a function of image quality.

* * * * *